(No Model.)　　　　　　　　　　　　　　　　　　3 Sheets—Sheet 1.
K. H. H. LEINEWEBER.
CAR BRAKE.

No. 308,617.　　　　　　　　　　　　Patented Dec. 2, 1884.

Witnesses
Frank J. Blanchard
Laus Nolting

Inventor:
Karl H. H. Leineweber
By Wm. H. Lotz & Co.
Attorneys.

(No Model.) 3 Sheets—Sheet 2.

K. H. H. LEINEWEBER.
CAR BRAKE.

No. 308,617. Patented Dec. 2, 1884.

Witnesses
Frank G. Blanchard
Louis Nolting

Inventor:
Karl H. H. Leineweber
By Wm. H. Lotz & Co.
Attys.

(No Model.) 3 Sheets—Sheet 3.

K. H. H. LEINEWEBER.
CAR BRAKE.

No. 308,617. Patented Dec. 2, 1884.

Witnesses:
Frank J. Blanchard
Louis Nolting

Inventor:
Karl H. H. Leineweber
By Wm. N. Lotz & Co.
Attys.

UNITED STATES PATENT OFFICE.

KARL H. H. LEINEWEBER, OF CHICAGO, ILLINOIS.

CAR-BRAKE.

SPECIFICATION forming part of Letters Patent No. 308,617, dated December 2, 1884.

Application filed August 27, 1884. (No model.)

*To all whom it may concern:*

Be it known that I, KARL H. H. LEINEWEBER, a subject of the Emperor of Germany, residing at Chicago, in the county of Cook and State of Illinois, have invented certain new and useful Improvements in Car-Brakes, of which the following is a specification, reference being had therein to the accompanying drawings.

My invention relates to an improved car-brake.

The object of the invention is to obtain a simple and effective mode of applying a brake to a single car or to the several cars of a train, if more than one is in use.

To the accomplishment of the above the invention consists of the novel devices and combination of devices, as will be described and claimed.

Figure 1:
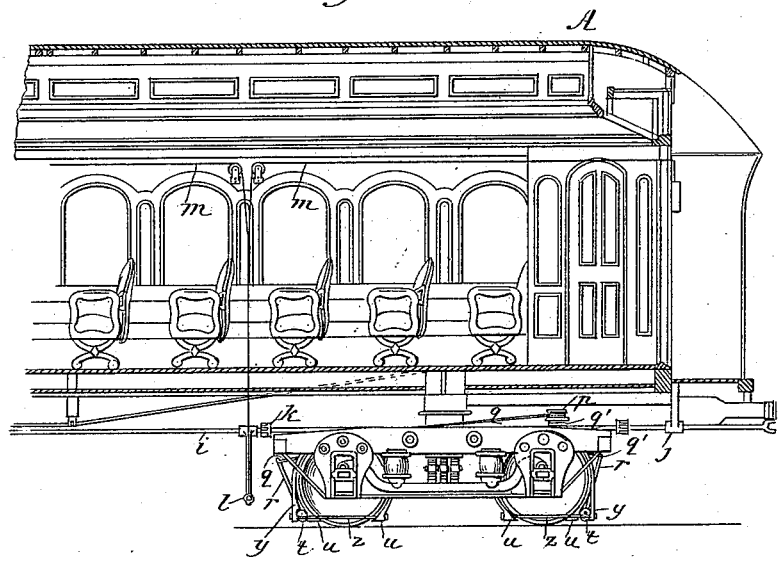
Figure 11:
Figure 2:
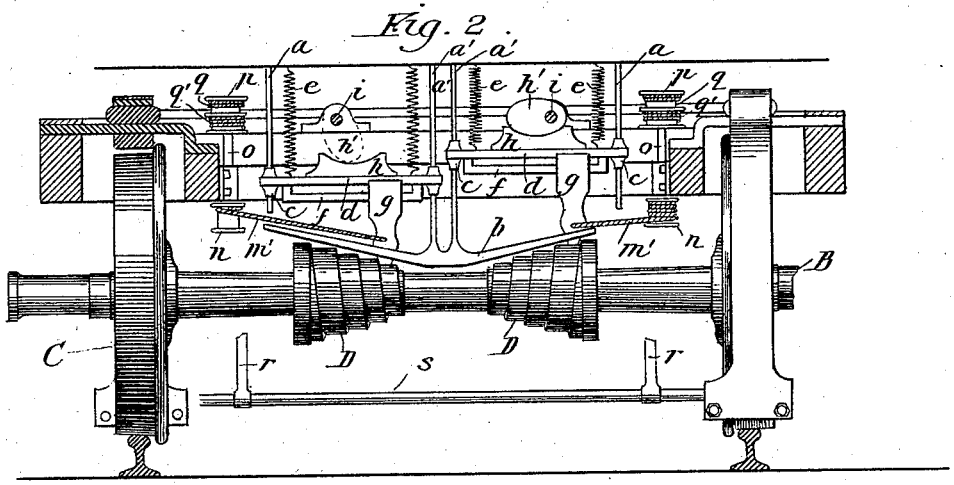
Figure 3:
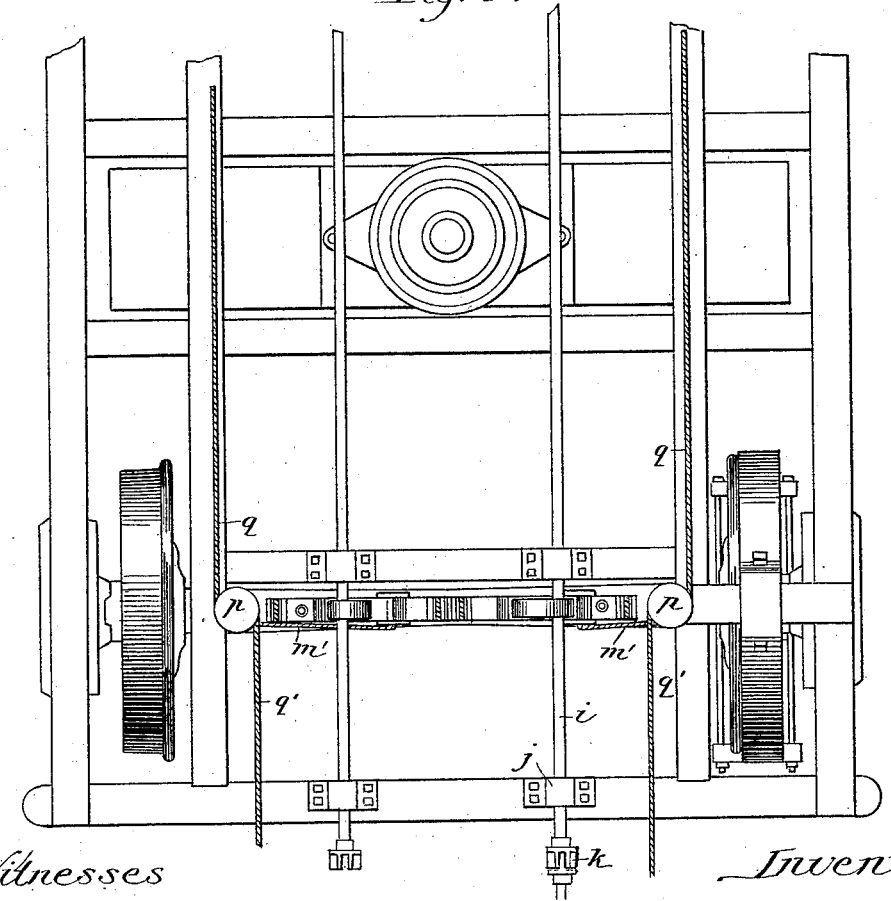
Figure 9:
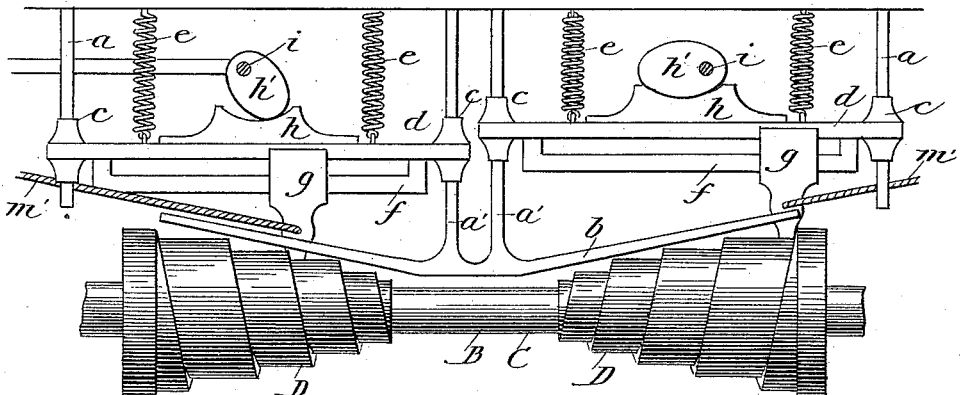
Figure 10:
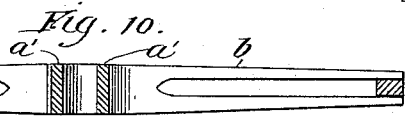

Reference will be made to the accompanying drawings, in which Figure 1 is a sectional elevation of a car with my improvements in position; Fig. 2, a cross-section through one truck of the car, with certain operative parts in elevation; Fig. 3, a plan of like parts; Figs. 4, 5, 6, 7, 8, views in detail of parts used; Fig. 9, an elevation on an enlarged scale of the parts shown in Fig. 2; Fig. 10, a view in detail of a guide employed, and Fig. 11 a transverse section of the rod-couplings.

Like letters refer to like parts in each view.

A represents a car to which my invention is to be applied. B is one axle thereof, and C C the wheels mounted thereon.

The devices to be described are used in connection with each pair of wheels; but in the further description to be given reference will be made, in so much as is practicable, to but one set of operative parts, the others being similar in construction, arrangement, and use.

Upon axle B, and at suitable points, are secured two screws, D, the smallest thread of each being at its inner end, as shown clearly in Figs. 2 and 9. At points above the axle there are suspended a suitable number of guide-rods, $a\ a'$, two of each being shown in the drawings. The rods $a'$, which are the central ones, extend down to within a short distance of the axle, and are then bent at an angle and on an upward incline to form the guide $b$, which, as clearly shown in Fig. 10, consists of a strip bifurcated from each end to within a short distance of its center.

Around each rod $a\ a'$ there is passed a hub, $c$, adapted to slide thereon, the hubs upon rods $a$ being each connected by a cross-piece or frame, $d$, with the hub upon the corresponding rod, $a'$, whereby two adjustable frames are formed, said frame being held at their highest position by a series of springs, $e$, situated as shown.

Formed with each frame, and consequently adjustable therewith, is a bar, $f$, upon each of which a block, $g$, is mounted and adapted to slide horizontally. Each block $g$ is formed with a lower pointed end, and is, at suitable times, adapted to engage with the corresponding screw, D, of axle B, and each of said blocks in its horizontal adjustment is adapted to move within the guide formed by the bifurcated ends of strip $b$.

Mounted upon each cross-piece or frame $d$ is a raised portion, $h$, hollowed out on its upper face and adapted to receive each a cam, $h'$. These cams are secured each to a rod, $i$, said rods having suitable bearings in the trucks, as shown at $j$ of Fig. 3, and extending the entire length of the train, the rods of each separate car being joined together in a suitable manner. Each rod $i$ is also provided with a coupling, as at $k$, to allow of the necessary movement of the trucks. Secured to each of such rods is a lever, $l$, to each of which a rope or cord, $m$, is secured, such ropes passing over pulleys in the car and within easy reach of the operator.

To each block $g$, hereinbefore referred to, is secured one end of a wire rope, $m'$, the other end of each rope being secured to a drum, $n$, mounted upon the lower end of a vertical shaft, $o$, these shafts having bearings, as shown in Fig. 2.

To the upper end of each shaft $o$ there is keyed a double drum, $p$. Secured to the upper portion of each of said drums $p$ is a rope, $q$, while to the lower portion thereof there is secured a rope, $q'$. The ropes $q$ extend from their drums toward the rear of each truck, and the ropes $q'$ toward the front end of the same. The outer end of each of such ropes is secured to the upper end of a lever, $r$ or $r'$, the levers $r$, to which ropes $q$ are secured, being mounted at their lower ends upon a shaft, $s$, which is suitably suspended at the rear of the truck, and the levers $r'$ of ropes $q'$ being likewise suspended at the front end of the truck. Upon each end of shafts $s$ there is formed a cam, $t$, there thus being one of such cams provided for each wheel. Almost entirely encircling each wheel is a band, $u$, formed of any suitable material—such as steel—and formed with an enlarged portion, $v$, in which an opening is formed for the insertion of a rubber spring, $w$, these bands being thus suspended upon elastic bearings from the truck.

Figure 4:
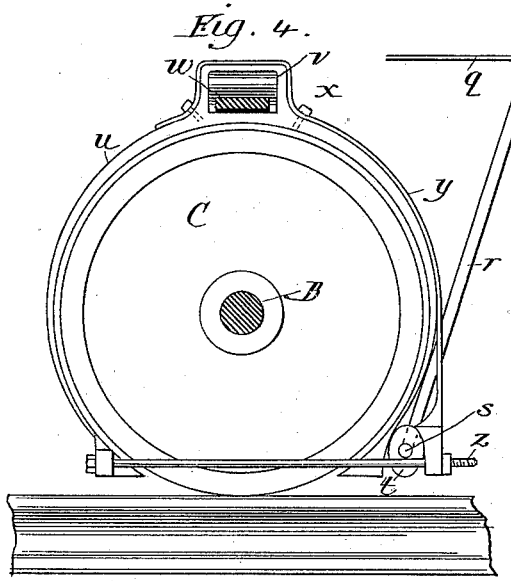
Figures 5, 6:
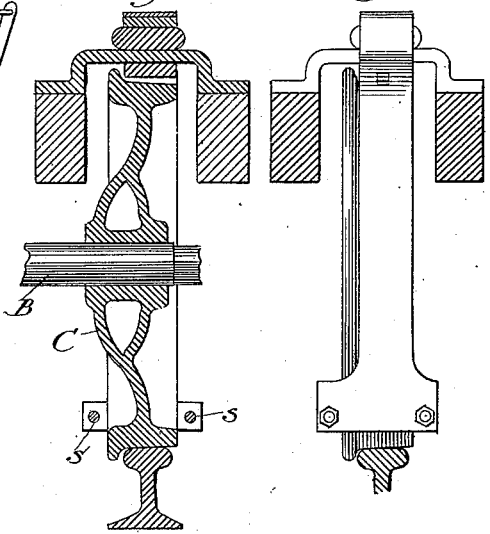
Figure 7:
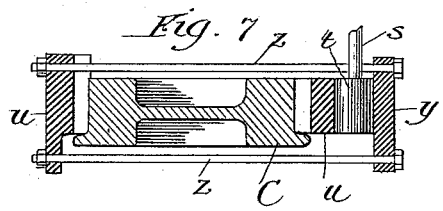
Figure 8:
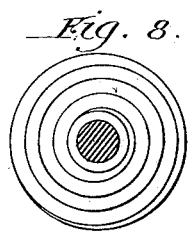

Secured by bolts $x$ to bands $u$, Fig. 4, is a band, $y$, which is only about one-half the length of band $u$, and which at its lower end is secured to rods $z$, said rods being attached at their opposite ends to the end of band $u$. Each cam $t$, hereinbefore referred to, occupies a position between the lower ends of bands $u$ and $y$, the lower ends of said bands being preferably of the shape shown in Fig. 4.

The operation of the device is as follows: It will be understood that when the brakes are not in use the frames $d$ are so elevated by their springs that the blocks $g$, mounted therein, will be out of contact with the screws D, and, further, that the bands $u$ will be carried by the rubber springs referred to from contact with the wheels, and, further, that the mechanism described is in duplicate for each pair of wheels, and that there is an operating-cord upon each side of the interior of the car. These points being understood, the car being in motion, and it becoming desirable to check the same, the operator pulls the cord upon one side of the car, and, according to the arrangement I have made, it will always be proper for him to select that cord which is upon the right side of the car with respect to its forward movement. He will thereby operate the lever $l$, connected with his particular cord, and partly revolve the rod $i$, connected therewith, this rod, as before mentioned, extending throughout the entire train, and being provided with a cam, $h'$, for each frame $d$ upon its side of the car.

Through the medium of cams $h'$ all the frames $d$ on the right-hand side of the train are depressed and the block $g$ of each brought into contact with its corresponding screw, D. Upon being brought into contact with screw D the block $g$ will follow the thread of said screw and be adjusted horizontally upon the bar $f$, the lower end of said block moving in the bifurcated end of guide $b$. In this manner block $g$ is caused to pull upon rope $m'$, and revolves drum $n$, connected therewith, whereby the shaft $o$, together with the double drum $p$, mounted upon its upper end, is also revolved. Upon the revolution of drum $p$ the ropes $q$ $q'$, secured thereto, are gradually wound thereupon, and the levers $r$ $r'$, situated at opposite ends of each truck, operated upon. This movement of levers $r$ $r'$ causes a partial revolution of shafts $s$, to which they are secured, and with said shafts the cams $t$, mounted upon the ends thereof. Upon this partial revolution of cams $t$ one end of each band $u$ is pressed against each wheel, while the free end of band $y$ is forced therefrom, this latter movement, through the medium of rods $z$, drawing the opposite end of band $u$ against the wheel also. This operation upon band $y$ also serves to tighten the bands around the wheel where bands $u$ and $y$ are connected, which is at the point where rubber spring $w$ is situated.

What I claim is—

1. In a car-brake, the combination, with screws situated upon the axles of the car, of bands partly encircling the wheels, and intermediate mechanism for tightening the bands through the medium of the screws, as set forth.

2. In a car-brake, the combination, with screws mounted upon the axles of the car, of bands partly encircling the wheels, intermediate mechanism for tightening the bands through the medium of the screws, and suitable mechanism for operating the parts from the interior of the car, as set forth.

3. In a car-brake, the combination of the following elements: screws mounted upon the car-axles, vertically-adjustable frames suspended thereabove, horizontally-adjustable blocks mounted in said frames and adapted at intervals to engage with the screws, bands partly encircling the wheels, and suitable mechanism intermediate of the blocks and bands for tightening said bands around the wheels, as and for the purpose set forth.

4. In a car-brake, the combination of the following elements: screws mounted on the car-axles, vertically-adjustable frames suspended by springs thereabove, horizontally-adjustable blocks mounted in said frames and adapted at intervals to contact with the screws, bands partly encircling the wheels, and suitable mechanism intermediate of the blocks and bands for tightening the latter around the wheels, as and for the purpose set forth.

5. In a car-brake, the combination of the following elements: screws mounted upon the car-axles, vertically-adjustable frames suspended by springs thereabove and moving upon suitable guide-rods, horizontally-adjustable blocks mounted in said frames and moving in guides formed therein, and adapted at intervals to contact with the screws, bands partly encircling the wheels, and suitable mechanism intermediate of the blocks and bands for tightening the latter around the wheels, as and for the purpose set forth.

6. In a car-brake, the combination of the following elements: screws mounted upon the car-axles, vertically-adjustable frames suspended thereabove, horizontally-adjustable blocks mounted in said frames and adapted to contact with said screws, bands partly encircling the wheels, suitable mechanism intermediate of the blocks and bands, and suitable rods with cams mounted thereon and connected with the interior of the car for depressing the adjustable frames and contacting the blocks with the screws, as and for the purpose set forth.

7. In a car-brake, the combination, with wheels C, of bands $u\ y$, and rods $z$, and suitable mechanism for tightening said bands around the wheels, as set forth.

8. In a car-brake, the combination, with wheels C, of bands $u\ y$, mounted upon rubber springs $w$, rods $z$, and suitable mechanism for tightening the bands around the wheels, as set forth.

9. In a car-brake, the combination, with screws D, mounted upon the car-axle, frames $d$, suspended thereabove, blocks $g$, mounted in said frames, cams $h'$, rods $i$, levers $l$, and cords $m$, the parts arranged as and for the purpose set forth.

10. In a car-brake, the combination, with screws D, mounted upon the car-axle, frames $d$, and blocks $g$, mounted therein, of suitable mechanism for contacting the blocks with the screws, ropes $m'\ q\ q'$, secured to suitable drums, levers $r\ r'$, rods $s$, cams $t$, mounted thereon, and suitable bands partly encircling the car-wheels and adapted to be operated upon by said cams, as and for the purpose set forth.

11. In a car-brake, the combination, with screws D, mounted upon the car-axles, frames $d$, and blocks $g$, mounted therein, of suitable mechanism for contacting the blocks with the screws, ropes $m'\ q\ q'$, secured to suitable drums, levers $r\ r'$, rods $s$, cams $t$, mounted thereon, bands $u\ y$, rods $z$, and rubber springs $w$, as and for the purpose set forth.

In testimony whereof I affix my signature in presence of two witnesses.

KARL H. H. LEINEWEBER.

Witnesses:
M. J. CLAGETT,
FRANK S. BLANCHARD.